US012753027B2

(12) United States Patent
Lu et al.

(10) Patent No.: US 12,753,027 B2
(45) Date of Patent: Oct. 6, 2026

(54) FLUID-FLOATED CONVEYING DEVICE

(71) Applicants: Kuo-Ching Lu, Taoyuan City (CN); Ku-Yuan Lu, Taoyuan City (CN)

(72) Inventors: Kuo-Ching Lu, Taoyuan City (CN); Ku-Yuan Lu, Taoyuan City (CN)

(73) Assignee: Ku-Yuan Lu, Taiwan City (CN)

( * ) Notice: Subject to any disclaimer, the term of this patent is extended or adjusted under 35 U.S.C. 154(b) by 71 days.

(21) Appl. No.: 18/838,302

(22) PCT Filed: Feb. 28, 2022

(86) PCT No.: PCT/CN2022/000028
§ 371 (c)(1),
(2) Date: Aug. 14, 2024

(87) PCT Pub. No.: WO2023/159335
PCT Pub. Date: Aug. 31, 2023

(65) Prior Publication Data

US 2025/0153957 A1 May 15, 2025

(51) Int. Cl.
*B65G 53/30* (2006.01)
*B65G 51/08* (2006.01)

(52) U.S. Cl.
CPC ............ *B65G 53/30* (2013.01); *B65G 51/08* (2013.01); *B65G 2201/0214* (2013.01); *B65G 2201/0291* (2013.01)

(58) Field of Classification Search
CPC ......... F03B 17/02; B65G 51/01; B65G 53/02; B65G 53/30; B65G 51/04
See application file for complete search history.

(56) References Cited

U.S. PATENT DOCUMENTS 7,025,079 B1 * 4/2006 Elnar ..................... F16K 24/04 4/541.3

FOREIGN PATENT DOCUMENTS

| | | | | |
|---|---|---|---|---|
| CN | 1338570 | A | | 3/2002 |
| CN | 208054448 | U | | 11/2018 |
| JP | H04125223 | A | | 4/1992 |
| JP | H05213597 | A | * | 8/1993 |

(Continued)

OTHER PUBLICATIONS

International Search Report filed in PCT/CN2022/000028 mailed Nov. 30, 2022.

*Primary Examiner* — Gene O Crawford
*Assistant Examiner* — Amari J Meddling
(74) *Attorney, Agent, or Firm* — Rankin, Hill & Clark LLP

(57) ABSTRACT

A fluid-floated conveying device includes a multi-channel space conversion cabin. An upper channel port is provided with a floating ball outlet gate which is communicated with a water pipe filled with a liquid. A side channel port is provided with a floating ball inlet gate communicated with the external atmosphere. A lower channel port is connected to a water storage pressure cylinder or a water discharging pipe. A floating ball carries articles and enters the cleared space conversion cabin from the side channel. The floating ball inlet gate of the side channel is closed, the cabin is filled with water, the floating ball outlet gate of the upper channel is opened, the floating ball rises and enters from the upper channel port, the communicated water pipe filled with the liquid, the water buoyancy enables the floating ball to rise, and the carried articles are conveyed to a receiving platform.

6 Claims, 9 Drawing Sheets

(56) References Cited

FOREIGN PATENT DOCUMENTS

| | | | | |
|---|---|---|---|---|
| JP | H06241000 | A | | 8/1994 |
| JP | 2020033895 | A | * | 3/2020 |

* cited by examiner

FLUID-FLOATED CONVEYING DEVICE

TECHNICAL FIELD

The present invention relates to a transportation device that uses a floating ball as a carrier to transport objects from a lower position to a higher position utilizing water buoyancy. Specifically, it pertains to a space conversion chamber with a convertible channel, allowing the floating ball to enter the liquid space from the bottom of a water-filled pipe without resistance.

BACKGROUND

Known technologies using water buoyancy to transport objects are limited to horizontal transportation, such as with ships. To utilize water buoyancy for transporting objects from a lower position to a higher position, the necessary device, if implemented with a lightweight object as the carrier and a water-filled pipe, requires that the lightweight object enter the pipe from the bottom. However, existing technologies have not solved this problem.

Therefore, to develop a device that uses water buoyancy to transport objects with low energy consumption, environmental friendliness, and rapid transportation, it is necessary first to overcome the technical problem of how a lightweight object, such as a floating ball, can enter the water pipe from the bottom.

SUMMARY OF THE INVENTION

To achieve the above objectives, the present invention provides a liquid floatation transportation device, which includes a space conversion chamber with a convertible channel. The upper channel is connected to a water-filled pipe, while the side channel is connected to the external atmosphere. A floating ball carrying an object enters the chamber from the side channel. After filling the chamber with liquid, the liquid in the water pipe and the space conversion chamber becomes unified. The floating ball rises and exits through the upper channel, entering the water pipe from the bottom and quickly ascending to a high-level receiving platform.

The liquid floatation transportation device comprises a multi-channel space conversion chamber, multiple channel gates, a water pressure cylinder device, an air intake and exhaust pipe, a water-filled pipe, a drain pipe, and at least one floating ball.

According to the invention, the multi-channel space conversion chamber is equipped with an air intake and exhaust pipe at an appropriate position. The upper channel opening of the space conversion chamber has a floating ball exit gate connected to a water-filled pipe. The side channel opening has a floating ball entry gate connected to the external space. The lower channel entry has a grid plate, and the outlet of the lower channel can be in two modes: a non-drain mode with a connected water pressure cylinder device, or a drain mode with a gate connected to a drain pipe.

The floating ball, as described in the invention, is a lightweight object. If hollow, it can carry objects, with a waterproof fastener on its exterior to secure the objects. If solid, it has a hook for hanging waterproof packaged items.

The water pressure cylinder device includes a pressure control machine, a water cylinder pipe, a sealed piston, and a pressure device. The piston rod of the pressure device is connected to the sealed piston inside the water cylinder pipe. The pressure device's guidance can control the sealed piston's ascent or descent within the water cylinder pipe. The liquid capacity stored in the water cylinder pipe must be equal to or greater than the liquid capacity of the space conversion chamber. The function of the water pressure cylinder device is to either draw all liquid from the space conversion chamber into the water cylinder pipe when the pressure device is guided to descend or to inject all stored liquid into the space conversion chamber when the pressure device is guided to ascend.

The air intake and exhaust pipe mainly includes a screw rod, a sealing ring, and a hollow object. Its function is to manage the flow of air when the pressure device is guided to descend, pulling the sealed piston down, causing the screw rod to descend and the sealing ring to detach from the airflow channel. This allows air to flow into the space conversion chamber and the liquid to be drawn into the water cylinder pipe. When the pressure device is guided to ascend, the process reverses, and liquid is injected back into the space conversion chamber, expelling air until the chamber is sealed again.

In the non-drain embodiment of the invention, the space conversion chamber has an air intake and exhaust pipe at the top and a water pressure cylinder device at the bottom channel. The process involves opening the floating ball entry gate, placing a floating ball with a weight less than its buoyancy into the empty chamber, closing the entry gate, and using the water pressure cylinder to fill the chamber with liquid, allowing the floating ball to rise and enter the water pipe. When the floating ball reaches the water surface, it is retrieved, the contents are removed, and the empty floating ball is returned for reuse.

In the drain embodiment, the space conversion chamber has a grid plate at the lower channel entry and a drain gate at the exit connected to a drain pipe. The process involves placing the floating ball into the empty chamber, filling the chamber with liquid from the connected water pipe, allowing the floating ball to rise and enter the water pipe. Once the floating ball reaches the surface, it is retrieved, the contents are removed, and the empty floating ball is returned for reuse.

The invention offers a new technique for fast, low-energy, continuous, and height-unrestricted transportation of objects. The weight of the objects carried by the floating ball can vary depending on the size of the floating ball and the capacity of the transportation equipment. For example, a floating ball with a diameter of 30 cm has a buoyancy of 14 kg and can carry objects below this weight, while a floating ball with a diameter of 1 meter has a buoyancy of 523 kg and can transport objects below this weight.

DESCRIPTION OF REFERENCE NUMERALS IN THE DRAWINGS

Figure 1:
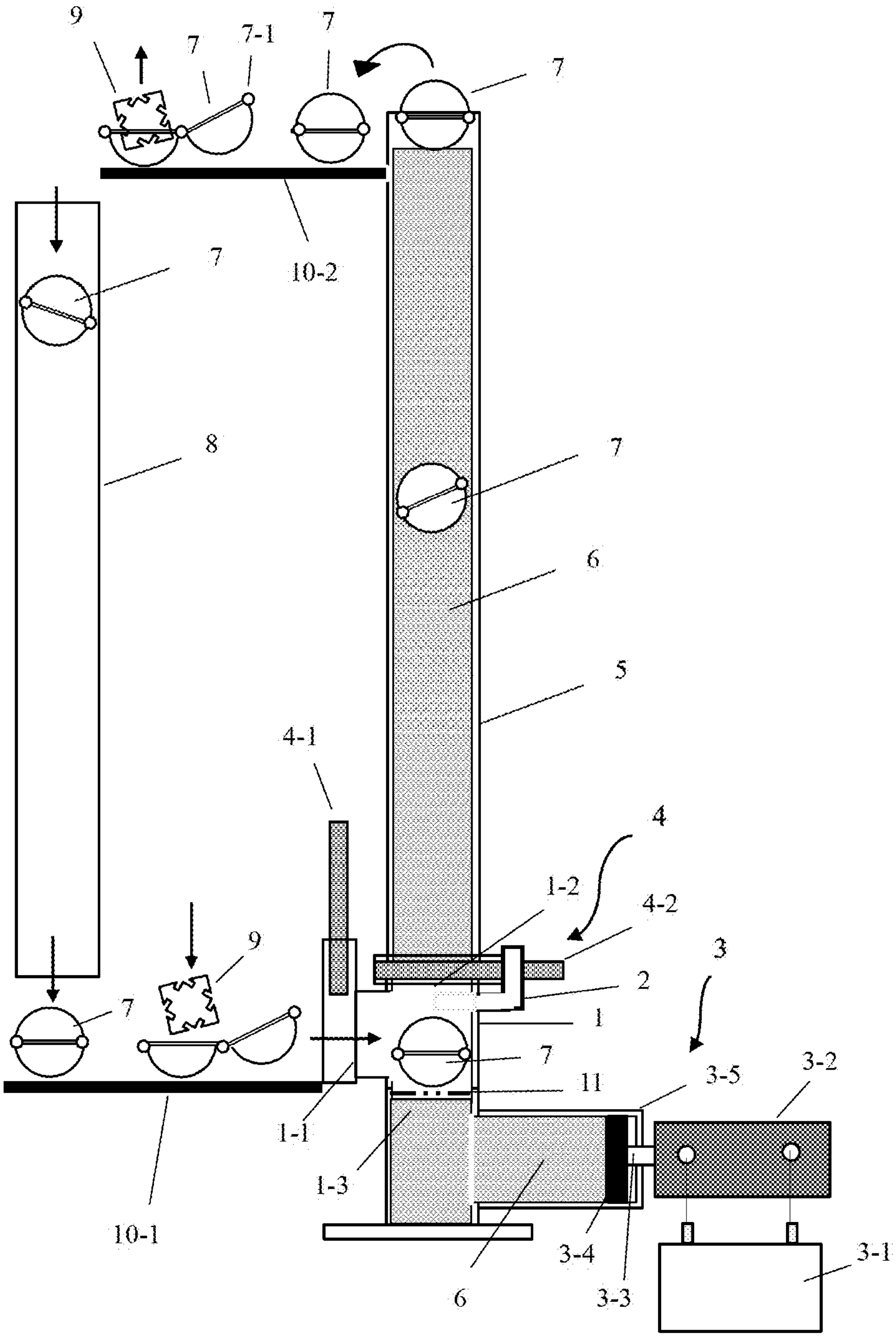
FIG. 1 is a schematic diagram of the non-drainage transport device according to the present invention.

1 Multi-channel space conversion cabin
1-1 Side channel
1-2 Top channel
1-3 Bottom channel
2 Suction and exhaust pipe
2-1 Hollow object
2-2 Screw extension hole
2-3 Air hole
2-4 Screw
2-5 Nut
2-6 Sealing ring
3 Water storage pressure cylinder device
3-1 Pressure control platform
3-2 Pressure device
3-3 Piston rod
3-4 Sealing piston
3-5 Water storage cylinder pipe
4 Gate
4-1 Floating ball inlet gate
4-2 Floating ball outlet gate
4-3 Drain outlet gate
5 Water pipe
6 Liquid
7 Floating ball
7-1 Floating ball fastener
7-2 Floating ball hook
8 Empty pipe
9 Transported item
10-1 Ground work platform
10-2 High-level work platform
11 Grid plate
12 Drainage pipe
13 Pump
14 Water delivery pipe
15 Water storage tank

DETAILED DESCRIPTION

A liquid float transport device comprises a multi-channel space conversion compartment (1), multiple channel gates (4), a storage pressure cylinder (3), an air suction and discharge pipe (2), a water pipe (5) filled with liquid (6), a drainage pipe (12), and at least one float ball (7).

Figure 3:
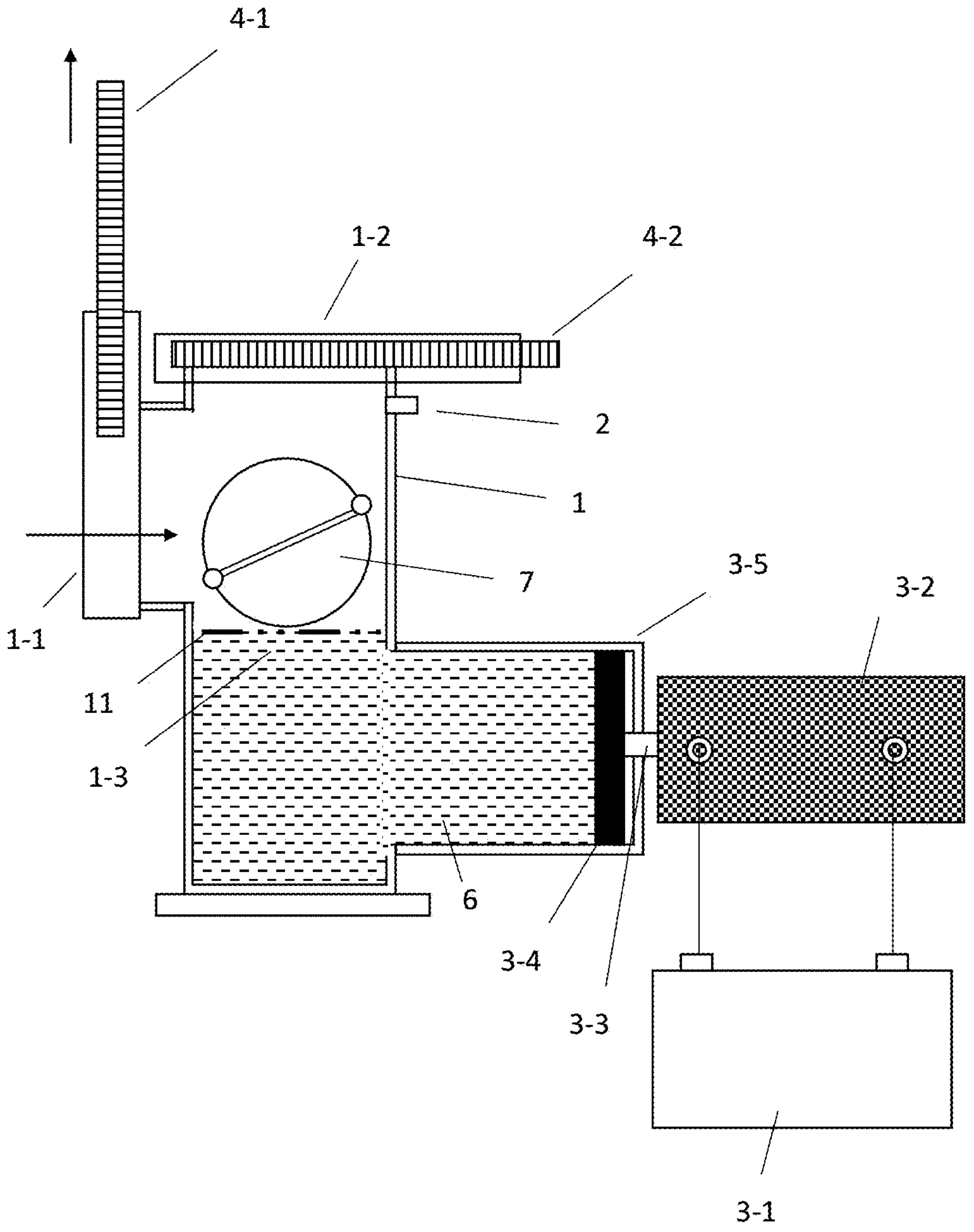
FIG. 3 is a schematic diagram of the water storage pressure cylinder drawing liquid to clear the space conversion cabin according to the present invention.
Figure 4:
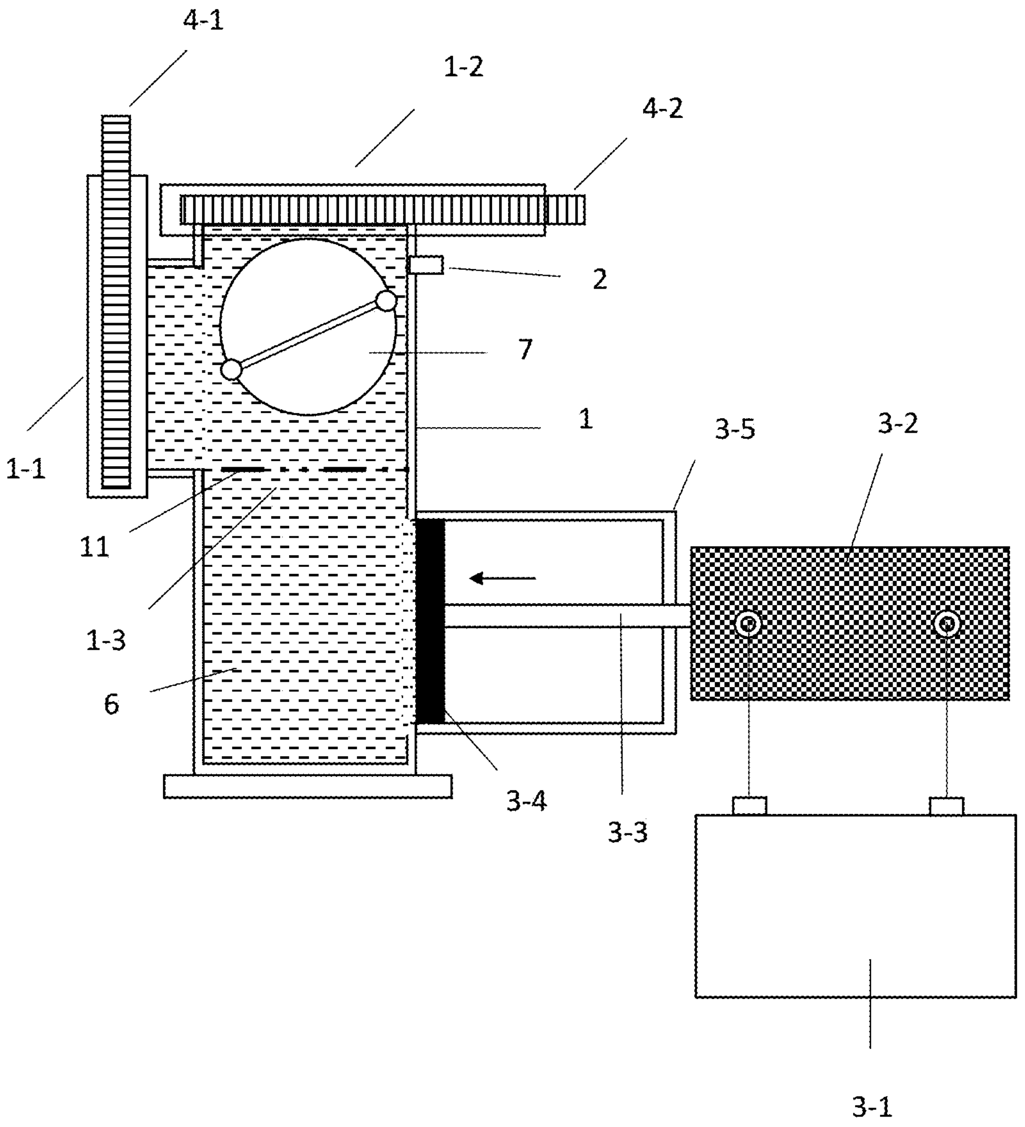
FIG. 4 is a schematic diagram of the water storage pressure cylinder pushing liquid into the space conversion cabin according to the present invention.

Refer to FIGS. 3 and 4. The multi-channel space conversion compartment (1) is equipped with an air suction and discharge pipe (2) at an appropriate position. The upper channel (1-2) of the space conversion compartment (1) is provided with a float ball outlet gate (4-2), which is connected to a water pipe (5) filled with liquid (6). The side channel (1-1) is equipped with a float ball inlet gate (4-1) communicating with the external space. At the entrance of the lower channel (1-3), a grate (11) is installed. At the outlet of the lower channel (1-3), there are two implementation modes. In the first mode, which is the non-drainage mode, a storage pressure cylinder device (3) is installed at the lower channel outlet. In the second mode, which is the drainage mode, a drainage gate (4-3) is installed at the lower channel (1-3) outlet, connected to a drainage pipe (12).

Refer to FIGS. 1, 3, and 4. The storage pressure cylinder device (3) includes a pressure control station (3-1), a storage cylinder pipe (3-5), a sealing piston (3-4), and a pressure unit (3-2). The piston rod (3-3) of the pressure unit (3-2) is connected to the sealing piston (3-4) inside the storage cylinder pipe (3-5). The pressure unit (3-2) guides the sealing piston (3-4) in the storage cylinder pipe (3-5) to move up or down. Specifically, the capacity of the liquid (6) stored in the storage cylinder pipe (3-5) must be equal to or greater than the capacity of the liquid (6) in the space conversion compartment (1). The function of the storage pressure cylinder device (3) is as follows: When the pressure unit (3-2) of the pressure control station (3-1) is guided to move downward, the sealing piston (3-4) in the storage cylinder pipe (3-5) descends, and the liquid (6) in the space conversion compartment (1) is entirely sucked into the storage cylinder pipe (3-5) for storage. When the pressure unit (3-2) of the pressure control station (3-1) is guided to move upward, the sealing piston (3-4) in the storage cylinder pipe (3-5) ascends, injecting all the stored liquid (6) back into the space conversion compartment (1).

Figure 8:
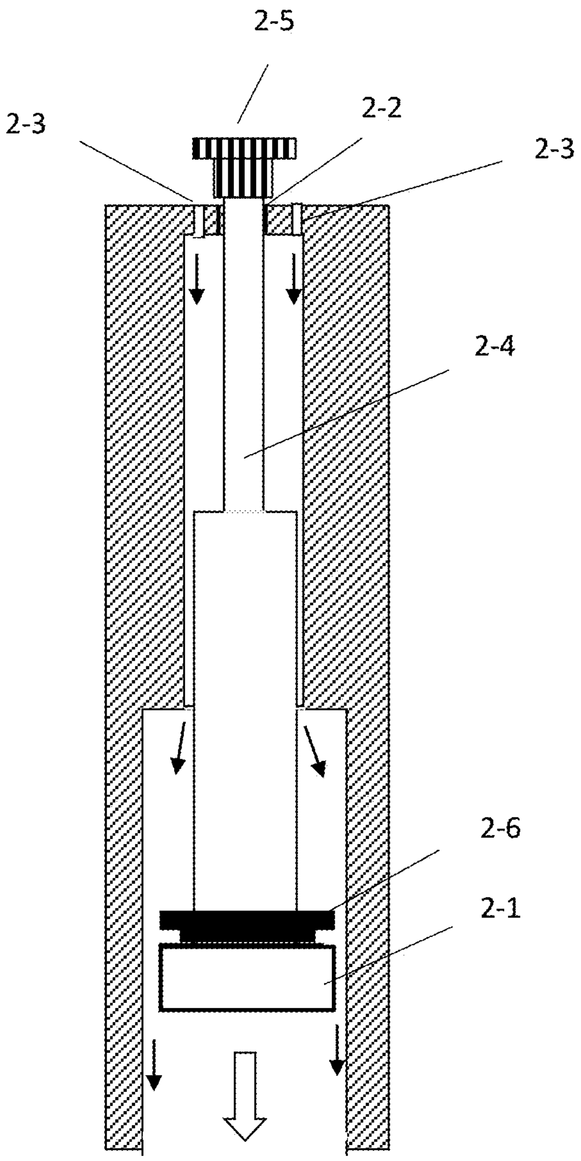
FIG. 8 is a schematic diagram of the suction and exhaust pipe drawing in air according to the present invention.
Figure 9:
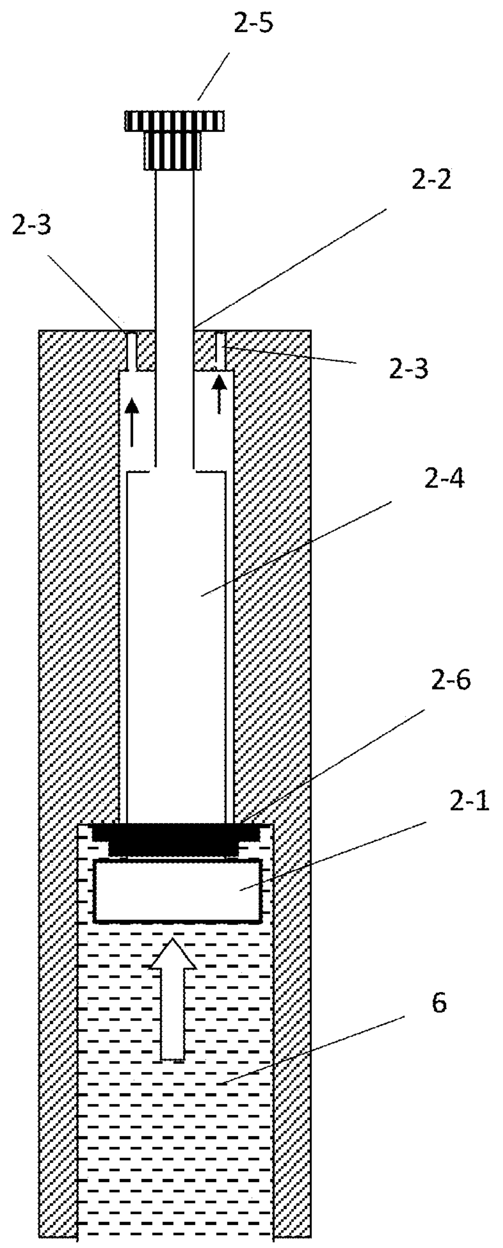
FIG. 9 is a schematic diagram of the suction and exhaust pipe expelling air and sealing the airflow channel according to the present invention.

Refer to FIGS. 8 and 9. The air suction and discharge pipe (2) comprises a screw telescoping hole (2-2), at least one air hole (2-3), a screw (2-4), a nut (2-5), a seal ring (2-6), and a hollow object (2-1). The hollow duct inside the air suction and discharge pipe (2) is divided into upper and lower sections, with the inner diameter of the upper duct being smaller than that of the lower duct. The air suction and discharge pipe (2) is installed at an appropriate position (e.g., the top) of the space conversion compartment (1), with the hollow duct inside the air suction and discharge pipe (2) communicating with the interior of the space conversion compartment (1). The screw (2-4) is divided into upper and lower sections, with the outer diameter of the upper section being smaller than that of the lower section. The upper section of the screw (2-4) passes through the screw telescoping hole (2-2) on the upper cover. The top end of the screw (2-4) is connected to a nut (2-5). When the nut (2-5) is guided to a set position by the downward movement of the screw (2-4), it presses against the upper cover to achieve positioning. The outer diameter of the lower section of the screw (2-4) is smaller than the inner diameter of the lower duct inside the air suction and discharge pipe (2), allowing air to flow through the remaining gap. A seal ring (2-6) and a hollow object (2-1) are installed at an appropriate position (e.g., the tail) of the lower section of the screw (2-4). The outer diameter of the seal ring (2-6) and the hollow object (2-1) is larger than the inner diameter of the upper duct inside the air suction and discharge pipe (2) but smaller than the inner diameter of the lower duct.

Refer to FIG. 9. The operational state of the air suction and discharge pipe (2) is as follows: When the storage pressure cylinder device (3) is activated and the liquid (6) inside the storage cylinder pipe is injected into the space conversion compartment (1) under high pressure, the liquid (6) enters the air suction and discharge pipe (2), pushing the hollow object (2-1) at the tail of the screw (2-4) upward. When the screw (2-4) reaches the set position, the seal ring (2-6) blocks the air flow passage between the upper and lower ducts, creating a completely sealed state within the air suction and discharge pipe (2) and the space conversion compartment (1), preventing the continuous high-pressure injected liquid (6) from flowing out through the air holes (2-3). Refer to FIG. 8. When the storage pressure cylinder device (3) is activated, the piston rod (3.3) of the pressure unit (3-2) retracts, pulling the sealing piston (3-4) down, sucking the liquid (6) from the space conversion compartment (1) into the storage cylinder pipe (3-5). Due to the suction effect, the screw (2-4) inside the air suction and discharge pipe (2) descends, and the seal ring (2-6) at the lower section of the screw (2-4) disengages from the air flow passage between the upper and lower ducts, allowing air to flow through the air holes (2-3) into the duct, and then through the gap between the screw (2-4) and the duct, entering the space conversion compartment (1), enabling the liquid (6) to be smoothly sucked into the storage cylinder pipe (3-5).

The present invention provides two embodiments to better understand its technical content. Specific examples of each mode are described below.

Non-Drainage Mode of a Liquid Float Transport Device: Refer to FIGS. 1, 3, and 4. In the non-drainage mode, a multi-channel space conversion compartment (1) contains the necessary liquid (6), which is either output or absorbed by the storage pressure cylinder (3). Since the space conversion compartment (1) operates in a sealed state, air must enter or exit to inject or discharge the liquid (6). Therefore, an air suction and discharge pipe (2) is installed at an appropriate position in the space conversion compartment (1). In specific implementation, the float ball inlet gate (4-1) on the side channel (1-1) of the space conversion compartment (1) is opened, and a float ball (7) carrying an object (9) (where the weight of the object (9) is less than the buoyancy of the float ball (7)) is placed into the compartment's cavity, which has been emptied of liquid (6). The float ball (7) rests on a grate (11) at the entrance of the lower channel (1-3). Subsequently, the float ball inlet gate (4-1) of the side channel (1-1) is closed. The pressure control station (3-1) of the storage pressure cylinder device (3) is activated in an upward direction, causing the piston rod (3-3) of the pressure unit (3-2) to extend, pushing the sealing piston (3-4) in the storage cylinder pipe (3-5) upward, injecting the liquid (6) in the cylinder pipe into the space conversion compartment (1). The air inside the compartment is expelled through the air suction and discharge pipe (2). When the liquid (6) enters the air suction and discharge pipe (2), it pushes the hollow object (2-1) installed at the tail of the screw (2-4) upward. When the hollow object (2-1) and the screw (2-4) are pushed to a set position, the seal ring (2-6) installed below the screw (2-4) blocks the air passage between the upper and lower ducts inside the air suction and discharge pipe (2), sealing the gap between the screw (2-4) and the duct. This prevents the high-pressure injected liquid (6) from flowing out through the air hole (2-3). The space conversion compartment (1) is now in a completely sealed state, and as high-pressure injection of the liquid (6) continues, the hydraulic pressure increases. When the pressure inside the compartment equals or exceeds the pressure at the bottom of the water pipe (5) connected above, the float ball outlet gate (4-2) on the upper channel (1-2) is immediately opened, connecting the upper water pipe (5) with the internal lower space conversion compartment (1). The liquids (6) from above and below merge, and the float ball rapidly rises, entering the water pipe (5) from the bottom. Simultaneously, the pressure unit (3-2) discharges all remaining liquid (6) from the storage cylinder pipe (3-5). As the float ball (7) enters the liquid space inside the water pipe (5) from the bottom, the buoyancy causes the float ball (7) to rise quickly until it reaches the water surface and loses buoyancy, stopping at the surface. Workers on the high working platform (10-2) extract the float ball (7), open the fastener (7-1), and remove the carried object (9). The empty float ball (7) is then placed into an empty tube (8) connected to the ground working platform (10-1), sliding down to the ground working platform (10-1), where workers retrieve the empty float ball (7) and reload it with an object (9). To reinsert the float ball (7) into the space conversion compartment (1), the liquid (6) inside the compartment must be discharged to empty it. First, the float ball outlet gate (4-2) on the upper channel (1-2) of the space conversion compartment (1) is closed. The pressure control station (3-1) is then activated in a downward direction, driving the storage pressure cylinder device (3) on the lower channel (1-3). The piston rod (3-3) of the pressure unit (3-2) retracts, causing the sealing piston (3-4) to descend. Due to the suction effect, the screw (2-4) inside the air suction and discharge pipe (2) descends, and the seal ring (2-6) at the lower section of the screw (2-4) disengages from the air passage between the upper and lower ducts. Air flows into the space conversion compartment (1) through the air hole (2-3) in the upper cover of the air suction and discharge pipe (2), and the liquid (6) inside the space conversion compartment (1) is entirely absorbed into the storage cylinder pipe (3-5) for storage. When the space conversion compartment (1) is empty, the float ball inlet gate (4-1) on the side channel (1-1) can be reopened, and the float ball (7) can be reinserted. This cycle repeats continuously, transporting objects (9) to the high working platform (10-2).

Figure 2:
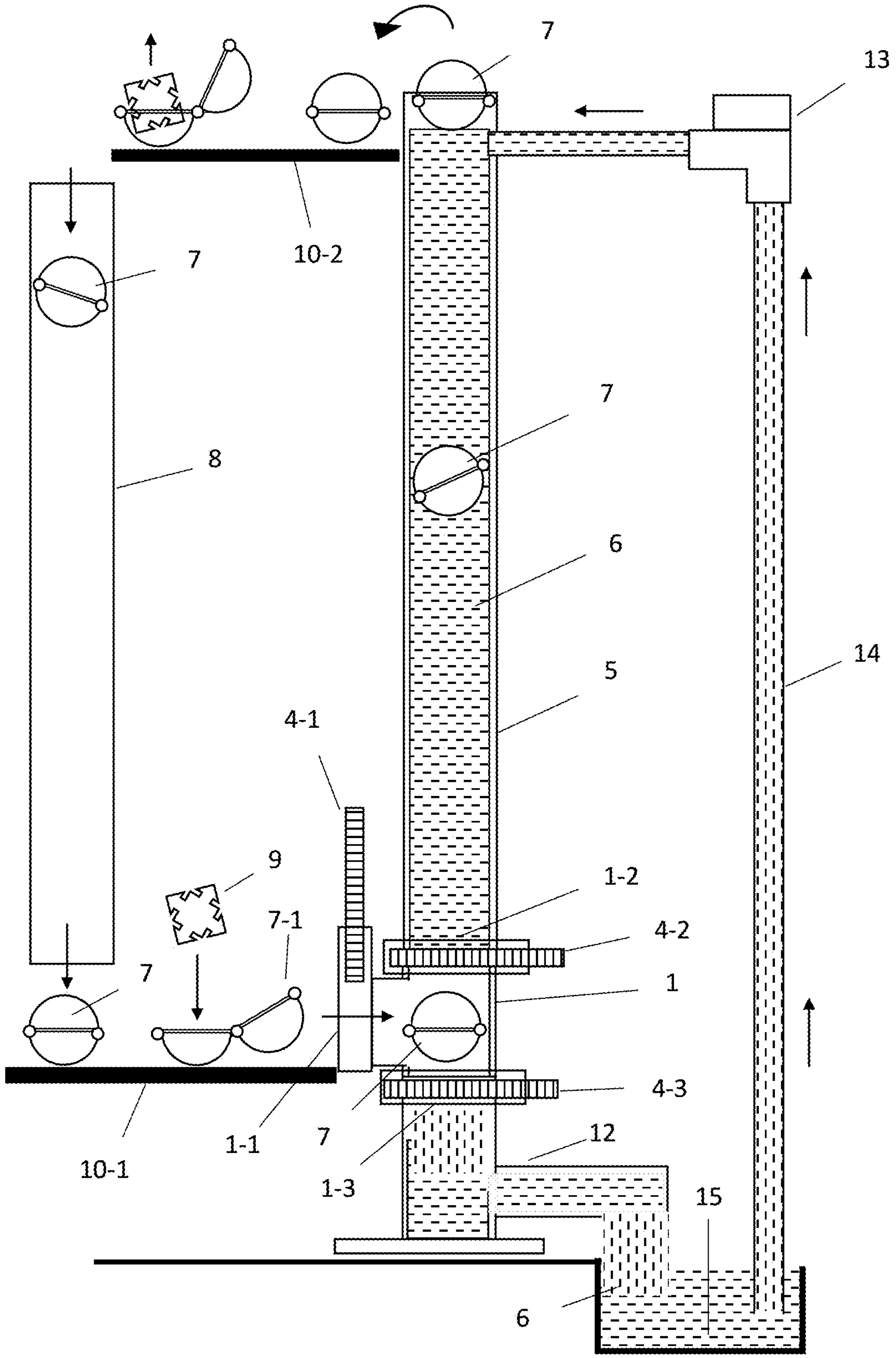
FIG. 2 is a schematic diagram of the drainage transport device according to the present invention.
Figure 5:
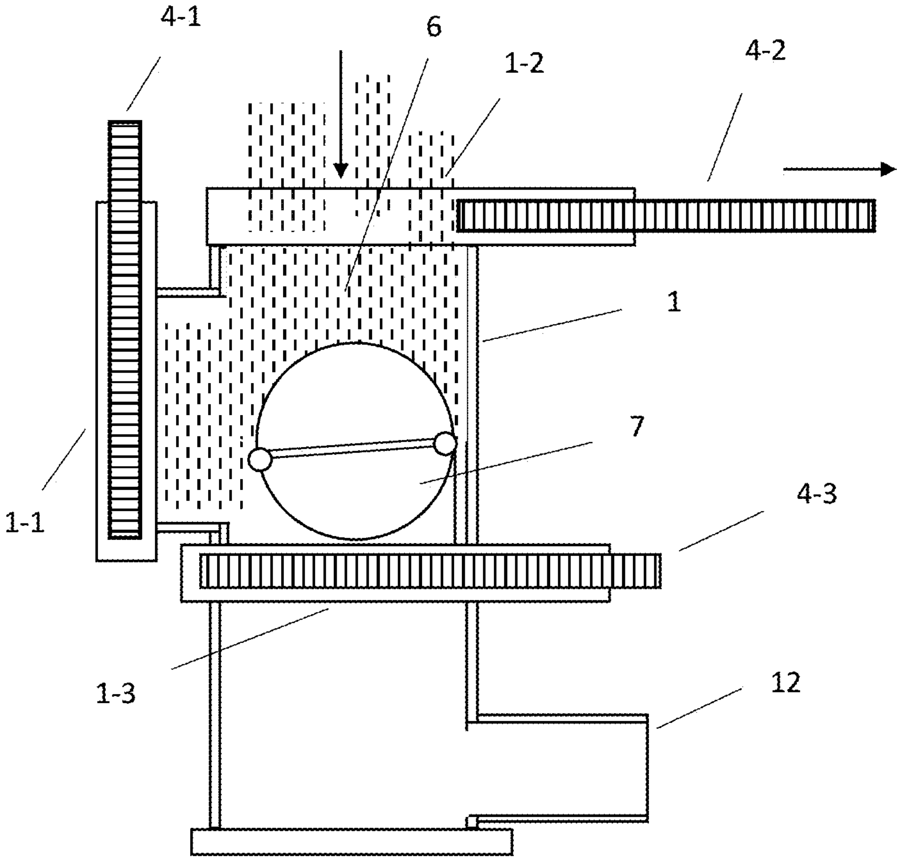
FIG. 5 is a schematic diagram of the space conversion cabin opening the top channel gate to allow liquid to flow into the cabin according to the present invention.
Figure 6:
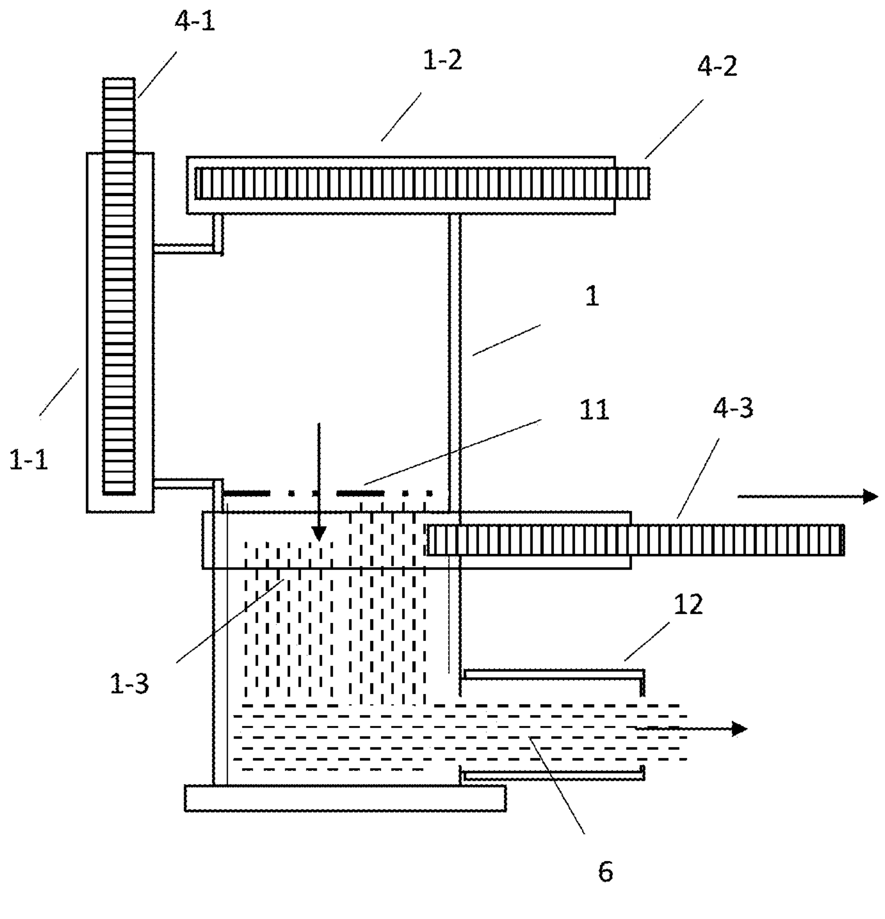
FIG. 6 is a schematic diagram of the space conversion cabin opening the bottom channel gate to allow liquid to flow into the drainage pipe according to the present invention.
Figure 7A:
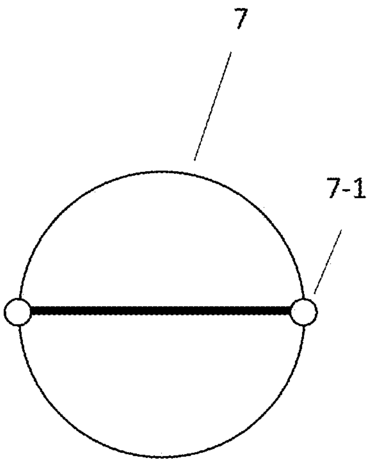
FIGS. 7A and 7B are schematic diagrams of the hollow floating ball in closed and open states according to the present invention.
Figure 7B:
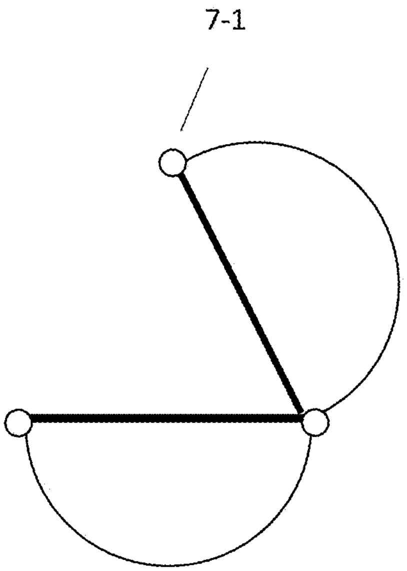
Figure 7C:
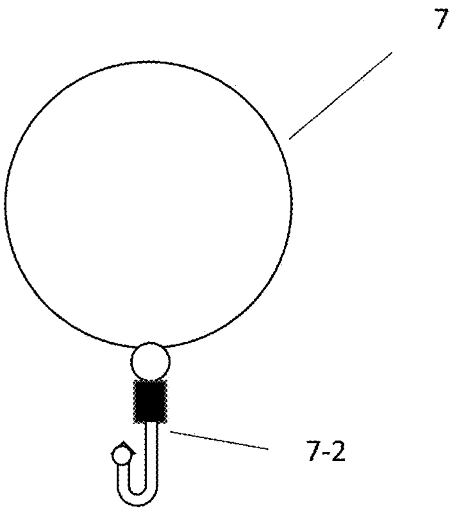
FIG. 7C is a schematic diagram of the floating ball hook according to the present invention.

Specific Implementation Example of the Drainage Mode of a Liquid Float Transport Device: Refer to FIGS. 2, 5, and 6. In this embodiment, the multi-channel space conversion compartment (1) requires the liquid (6) to flow in from the water pipe (5) connected to the upper channel (1-2) and to be discharged through the lower channel (1-3). A grate (11) is installed at the entrance of the lower channel (1-3) to hold the float ball (7). A drainage gate (4-3) is installed at the exit of the lower channel (1-3), connecting to a drainage pipe (12). In specific implementation, the float ball inlet gate (4-1) of the side channel (1-1) of the space conversion compartment (1) is opened, and a float ball (7) carrying an object (9) (where the weight of the object (9) is less than the buoyancy of the float ball (7)) is placed into the empty compartment. The float ball (7) rests on the grate (11). Then, the float ball inlet gate (4-1) of the side channel (1-1) is closed, and the drainage gate (4-3) of the lower channel (1-3) is also closed. The float ball outlet gate (4-2) of the upper channel (1-2) is opened, allowing the liquid (6) from the water pipe (5) to flow in and fill the space conversion compartment (1). The upper water pipe (5) and the lower space conversion compartment (1) are now connected, and the liquid (6) merges. The float ball (7) quickly rises through the water pipe (5) due to buoyancy until it reaches the water surface and loses buoyancy, remaining on the surface. Workers on the high working platform (10-2) retrieve the float ball (7) and the object (9), then place the empty float ball (7) into an empty tube (8) connected to the ground working platform (10-1). The empty float ball (7) slides down to the ground working platform (10-1), where workers reload it with an object (9). If the object is too large to fit inside the float ball (7), it can be hung using a hook (7-2). To reinsert the float ball (7) into the space conversion compartment (1), the liquid (6) inside the compartment must be discharged to empty it. First, the float ball outlet gate (4-2) of the upper channel (1-2) is closed. Then, the drainage gate (4-3) of the lower channel (1-3) is opened, allowing the liquid (6) inside the space conversion compartment (1) to be discharged through the drainage pipe (12) into the storage tank (15). Once the space conversion compartment (1) is empty, the drainage gate (4-3) of the lower channel (1-3) is closed. The float ball inlet gate (4-1) of the side channel (1-1) is then reopened to reinsert the float ball (7) carrying the object (9). This cycle repeats continuously, transporting objects (9) to the high working platform (10-2). Simultaneously, the liquid (6) discharged into the storage tank (15) is pumped by the pump (13) through the water delivery pipe (14) back into the water pipe (5), ensuring a continuous supply of liquid (6).

The above description of the invention is illustrative and not restrictive. Those skilled in the art can make numerous modifications, variations, or equivalents without departing from the spirit and scope of the claims, all of which fall within the protection scope of the present invention.

The invention claimed is:

1. A liquid buoyancy vertical transport apparatus, comprising:

- a float configured to carry an associated article and be transported by liquid buoyancy;
- a water pipe filled with a liquid, in which the float is configured to rise;
- a space conversion chamber formed by a three-way conduit and having an upper port, a side port, and a lower port for selectively accommodating the float ball and the liquid;
- a first gate disposed at the upper port for selectively communicating the space conversion chamber with the liquid;
- a second gate disposed at the side port for selectively communicating the space conversion chamber with an atmospheric space;
- a water storage and pressurization cylinder fluidly connected to the lower port and configured to selectively draw liquid from the space conversion chamber for storage or refill stored liquid back into the space conversion chamber; and
- an air intake/exhaust conduit fluidly connected to an interior of the space conversion chamber, the conduit having an upper outlet located above the first gate, and the conduit being a single valve body configured to automatically perform air intake, air discharge, and liquid blocking,
- wherein, when the first gate and the second gate are closed, the water storage and pressurization cylinder draws substantially all liquid from the space conversion chamber to form a liquid-free cavity allowing the float to enter without resistance, and thereafter refills liquid and opens the first gate such that the float rises by buoyancy into the water pipe to complete vertical transport.

2. The liquid buoyancy vertical transport apparatus of claim 1, wherein the water storage and pressurization cylinder comprises a storage pipe, a sealing piston, a pressure actuator, and a pressure control unit configured to drive the sealing piston upward or downward to perform liquid evacuation and refill.

3. The liquid buoyancy vertical transport apparatus of claim 1, wherein the air intake/exhaust conduit comprises a screw rod, a sealing ring, and a hollow body disposed in a single valve body to automatically perform air intake, air discharge, and liquid sealing.

4. The liquid buoyancy vertical transport apparatus of claim 1, wherein the lower port is dedicated to liquid handling and fluidly connected to the water storage and pressurization cylinder.

5. The liquid buoyancy vertical transport apparatus of claim 4, further comprising a drainage gate configured to discharge liquid from the space conversion chamber to a drainage pipe.

6. The liquid buoyancy vertical transport apparatus of claim 1, wherein an inlet of the lower port includes a grating plate configured to support the float while allowing liquid to flow through the space conversion chamber.

* * * * *